US005592029A

United States Patent [19]

Hollstein et al.

[11] Patent Number: 5,592,029
[45] Date of Patent: Jan. 7, 1997

[54] POWER TAKEOFF CONTROL

[75] Inventors: Jürgen Hollstein; Gerd Redemann, both of Mannheim, Germany

[73] Assignee: Deere & Company, Moline, Ill.

[21] Appl. No.: 500,034

[22] Filed: Jul. 10, 1995

[30] Foreign Application Priority Data

Aug. 11, 1994 [DE] Germany ............... 44 28 368.7

[51] Int. Cl.$^6$ ............................................. B60K 26/00
[52] U.S. Cl. .............................. 307/9.1; 172/492; 180/321; 180/53.6
[58] Field of Search ....................... 307/9.1, 10.1, 307/114, 115, 141, 141.4; 74/11; 172/74, 492; 192/40, 84 R; 340/425.5, 439, 458, 468, 471; 180/321, 323, 53.6, 53.7, 53.1; 200/43.03

[56] References Cited

U.S. PATENT DOCUMENTS

| | | | |
|---|---|---|---|
| 3,793,908 | 2/1974 | Luff et al. | 477/138 |
| 4,317,500 | 3/1982 | Bening | 180/53.1 |
| 4,828,452 | 5/1989 | Bolitho | 180/321 |
| 5,280,282 | 1/1994 | Nagafusa et al. | 340/825.5 |
| 5,310,974 | 5/1994 | Churchill et al. | 200/43.03 |
| 5,449,956 | 9/1995 | Williams | 307/10.1 |

FOREIGN PATENT DOCUMENTS

| | | |
|---|---|---|
| 1055809 | 6/1979 | Canada . |
| 74136 | 6/1970 | Germany . |
| 2651147 | 5/1977 | Germany . |
| 2605681 | 8/1977 | Germany . |
| 3431433 | 3/1986 | Germany . |

*Primary Examiner*—William M. Shoop, Jr.
*Assistant Examiner*—Richard T. Elms

[57] ABSTRACT

A system includes a selector switch and a control device. The selector switch is positioned inside a cab of a work vehicle and coupled to main and remote switches, which are in turn coupled to a voltage source. The selector switch can be used to select standard and remote modes that allow, respectively, the main and remote switches to engage and disengage a power takeoff (PTO) on the work vehicle. The control device is coupled to the switches and the PTO to interpret combinations of positions of the switches for engagement and disengagement of the PTO, preferably based on testing of the combinations with stored preselected conditions. Further, the control device activates warning signalers according to conditions of the system.

12 Claims, 3 Drawing Sheets

POWER TAKEOFF CONTROL

TECHNICAL FIELD

The invention relates generally to systems for engaging and disengaging power takeoffs (PTOs), and more particularly to systems for engaging and disengaging PTOs using main and remote switches.

BACKGROUND ART

In work vehicles such as agricultural tractors, a power takeoff, commonly returned to as a PTO, is used in known ways to drive various accessories or implements such as balers, mowers, corn pickers, and forage harvesters. A number of these work vehicles include front and rear PTOs.

Usually, the PTO can be engaged and disengaged from the power train of the work vehicle using a main switch positioned inside the cab. Frequently, the PTO can be engaged and disengaged also by a remote switch positioned outside the cab. The remote switch often is a push button or momentary contact switch the operator must continuously press in order to engage the PTO.

Shortcomings of these systems include problems resulting from conflicting operation of the main and remote switches. For instance, directions from a first operator operating the main switch inside the cab can conflict with directions from a second operator operating the remote switch outside the cab. Also, the rotational speed of the PTO can vary if the implement or accessory becomes overloaded and overloads the engine. Such variation of the rotational speed can harm the operator, the work vehicle, as well as the driven implement or accessory. Additionally, continuously engaging the PTO using the momentary contact remote switch requires continuous attention from the operator.

It is desirable to decrease the potential for conflicting directions-from operators using the main and remote switches to engage the PTO, increase the safety of using the PTO to drive the implements or accessories, and decrease the time the operator must press the momentary contact remote switch to continuously engage the PTO.

SUMMARY OF THE INVENTION

One object of the invention is to decrease the potential for conflicting directions from operators using main and remote switches to engage a power takeoff (PTO) of a work vehicle.

Another object is to increase the safety of using a PTO of a work vehicle to drive implements or accessories.

A further object of the invention is to decrease the time an operator must continuously press the momentary contact remote switch to continuously engage a PTO of a work vehicle.

According to the present invention, the foregoing and other objects and advantages are attained by a system for engaging and disengaging at least one PTO of a work vehicle. A control device is connected to main, selector, and remote switches. The main and selector switches are located on the vehicle operator'platform (inside the cab). The remote switch is attached outside the operator'platform, for example, to the right and/or left fender. The selector switch is used to select between a standard mode and a remote mode. The control device preferably is a programmable electronic control unit with a fixed memory through which operations and automatic functions can be performed.

If the standard mode of the system is activated, the PTO can be engaged and disengaged by the main switch. The PTO preferably can also be disengaged by the remote switch. But, an engagement of the PTO by the remote switch is not possible.

For safety reasons, the PTO preferably must be disengaged in order to activate the remote mode. The selector switch is used to select the remote mode. The main switch is used to activate the remote mode, which is indicated acoustically and/or optically.

Once the remote mode of the system is activated, the PTO can be engaged and disengaged by the remote switch. The PTO preferably can also be disengaged by the main switch. In order to decrease the potential for conflicting directions from first and second operators inside and outside the cab, one must exit the remote mode in order to use the main switch for engaging the PTO.

In the remote mode, if the remote switch is operated only briefly, for example, less than four seconds, then it is advantageous for safety reasons that the PTO remains engaged only for the duration of the operation of the remote switch and is disengaged automatically immediately thereafter. If the duration of the operation of the remote switch is longer, for example, four seconds or more, then the PTO continues to be engaged even after release of the remote switch. The PTO can be disengaged by again pressing the remote switch (or by turning off the main switch). The actuation of the remote switch in the remote mode preferably is indicated in the cab acoustically and/or optically.

In order to recognize malfunctions outside the system, the rotational speed of the PTO is sensed while starting as well as during operation. If the PTO rotational speed has not reached a preselected rotational speed of, for example, one hundred revolutions per minute (rpm) within a preselected time interval of, for example, five seconds after the PTO has been engaged, or if it slows below the one hundred rpm for five seconds during operation, then the PTO is disengaged automatically and can be engaged again only after all the switches have been brought to their off positions. This procedure prevents the danger of electrical, mechanical, or hydraulic malfunctions temporarily stopping and then unsafely accelerating the PTO. Furthermore, it is advantageous for the control device to monitor continuously the operation of the components of the system and automatically disengage the PTO and produce warning signals if a malfunction occurs.

The system according to the invention makes possible safe and reliable operation of the PTO with a high degree of operator comfort. The system can be constructed easily by generally employing components already present on the work vehicle. For example, the control device already exists on many modern work vehicles and only needs to be programmed properly. The acoustic and/or optical signals simplify the operation of the PTO and warn the operator of dangerous conditions of the system.

Additional objects, advantages, and novel features of the invention will become apparent to those skilled in the art upon examination of the following detailed description of the preferred embodiments of the invention when read in conjunction with the accompanying drawings.

DETAILED DESCRIPTION OF THE PREFERRED EMBODIMENTS of the Invention

Figure 1:
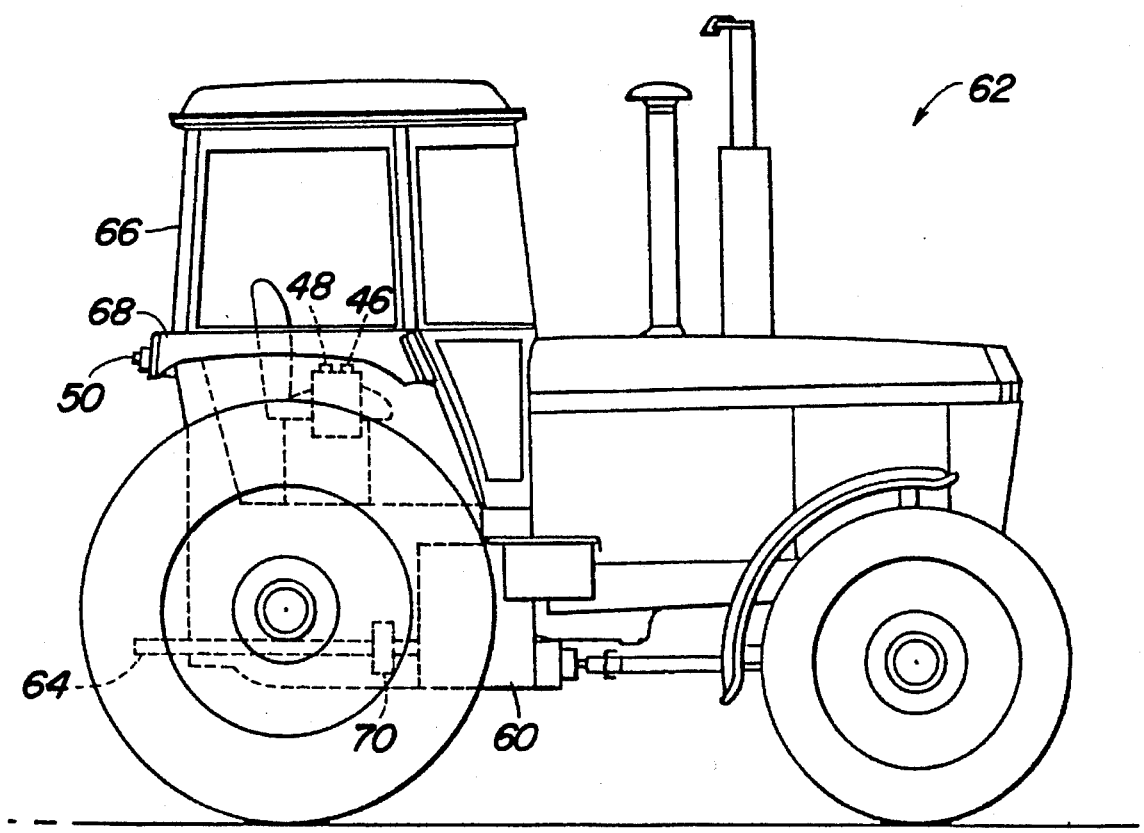
FIG. 1 is a side representation showing a work vehicle incorporating a system constructed according to the present invention.

FIG. 1 shows a work vehicle 62, such as an agricultural tractor, having a power train 60 and a rear power takeoff (PTO) 64 that can be engaged using a magnetic clutch 70. The work vehicle 62 has a cab 66. An operator can engage the clutch 70 using main and remote switches 46, 50 positioned, respectively, inside and outside the cab 66. The main and remote switches 46, 50 can be switched between OFF and ON positions. The remote switch 50 preferably is a push button, momentary contact switch that can be released to its OFF position or pressed to its ON position. In the drawings, for exemplary purposes, the remote switch 50 is located on a rear fender 68 of the work vehicle 62.

Figure 2:
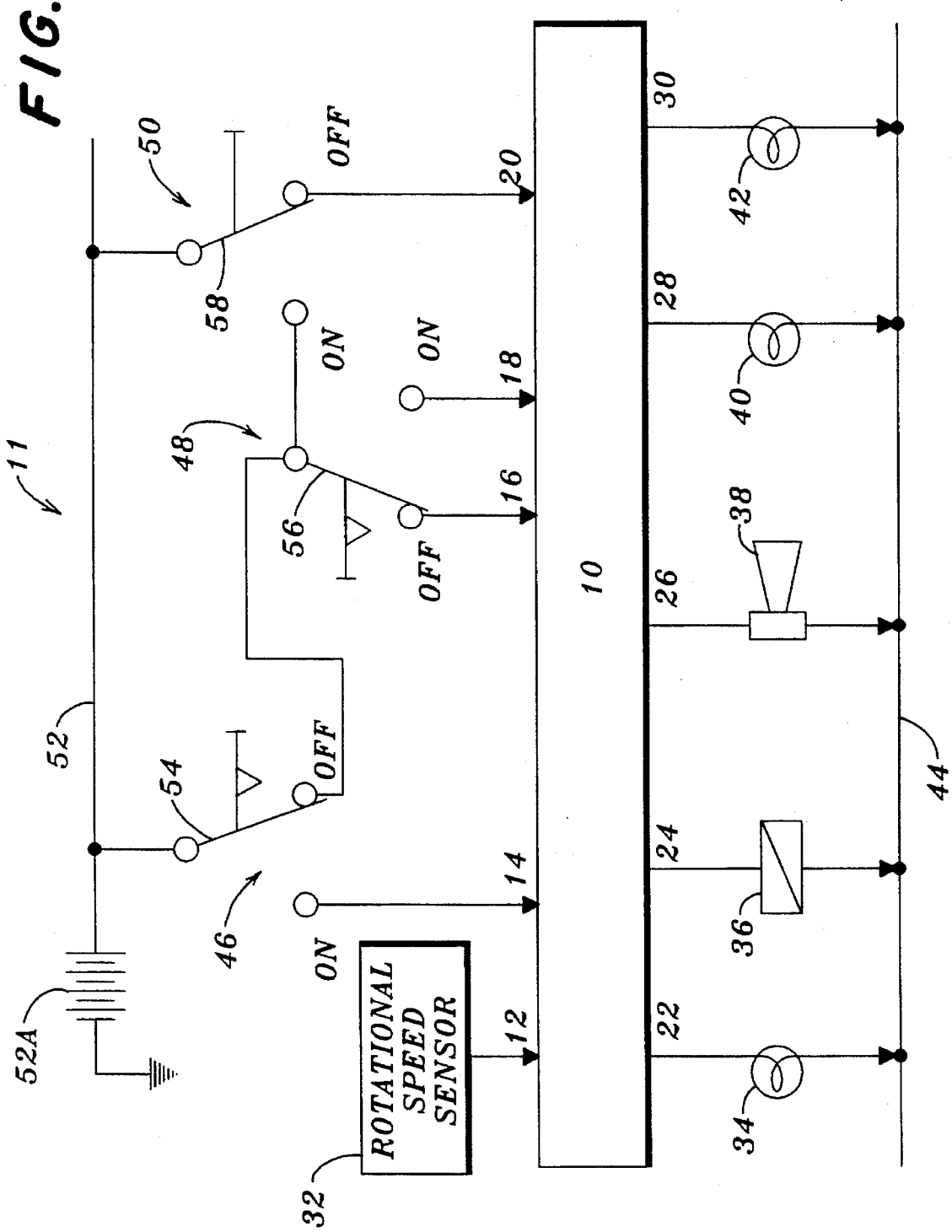
FIG. 2 is a circuit diagram of a system according to the invention.

As shown in FIG. 2, the switches 46, 50 are part of a system 11 that includes a voltage source line 52, and a control device 10. Source line 52 and control device 10 are both connected to the main and remote switches 46, 50. The voltage source line 52 can be connected to a battery 52a through the vehicle ignition switch (not shown). A selector switch 48 is positioned inside the cab 66 and coupled to the control device 10 as well as to the main and remote switches 46, 50. The selector switch 48 can be switched between OFF and ON positions to select between, respectively, a standard mode (OFF), in which the PTO 64 can be engaged and disengaged by the main switch 46, and a remote mode (ON), in which the PTO 64 can be engaged and disengaged by the remote switch 50.

The control device 10 preferably is a programmable electronic control unit having a memory (not shown) that can be programmed with preselected conditions, values, functions, and operations. Further, the control device 10 is already present on the modern work vehicle for monitoring and controlling various activities and includes known electronic components (not shown) such as signal processors, control relays, and timing circuits. The timing circuits (not shown) measure elapsed time for various circumstances, as discussed below. The control device 10 has many inputs, but for the purpose of the preferred embodiment, five inputs 12, 14, 16, 18, 20 and five outputs 22, 24, 26, 28, 30 are employed.

The input 12 is coupled to a rotational speed sensor 32 that is positioned adjacent to the PTO 64 for providing revolutions per minute (rpm) of the PTO 64 to the control device 10. The input 14 is coupled to the ON contact of the main switch 46. The inputs 16, 18 are coupled to the OFF and ON contacts, respectively, of the selector switch 48. The input 20 is coupled to the OFF contact of the remote switch 50.

The outputs 22, 24, 26, 28, 30 are coupled to warning flashers 34, a magnetic coil 36, an acoustic signaler 38, a remote mode indicator light 40, and a PTO indicator light 42, respectively, which in turn are coupled to chassis 44 of the work vehicle 62 in order to ground their respective electrical circuits. The warning flashers 34 are visible outside the cab 6 and warn anyone nearby of activation of the remote mode of the system 11. The warning flashers 34 can be exterior warning flashers commonly provided on many work vehicles such as agricultural tractors and industrial equipment. The magnetic coil 36 is used to engage the clutch 70 for the PTO 64. The acoustic signaler 38 and the lights 40, 42 are positioned inside the cab 66 for alerting the operator to various conditions of the system 11, as discussed below.

The main switch 46 includes switching device 54 that the operator can move between its OFF and ON positions. Switching the main switch 46 to its OFF position couples the voltage source line 52 to the selector switch 48. Switching the main switch 46 to its ON position couples the voltage source line 52 to the input 14 of the control device 10.

The remote switch 50 includes switching device 58 that the operator can move to the ON position and which returns to its OFF position upon release by the operator. Switching the remote switch 50 to its ON position couples the voltage source line 52 to the selector switch 48. Releasing the remote switch 50 to its OFF position couples the voltage source line 52 to the input 20 of the control device 10.

The selector switch 48 includes switching device 56 that the operator can move between its OFF and ON positions. Switching the selector switch 48 to its OFF position couples the voltage source line 52 to the input 16 of the control device 10 when the main switch 46 is in its OFF position. Switching the selector switch 48 to its ON position couples the voltage source line 52 to the input 18 of the control device 10 when the main switch 46 is in its OFF position.

The positions of the switches 46, 48, 50 at any given time transmit signals to the control device 10 for processing. Based on the positions of the switches 46, 48, 50, the control device 10 activates or deactivates the magnetic coil 36, the lights 34, 40, 42, and the acoustic signaler 38, as discussed below.

When the system 11 is in the standard mode, the main switch 46 can be used to activate the magnetic coil 36 and engage the clutch 70. Preferably, in the standard mode of the system 11, either the main switch 46 or the remote switch 50 can be used to deactivate the magnetic coil 36. But, in the standard mode of the system 11, the remote switch 50 cannot be used to activate the magnetic coil 36.

When the system 11 is in the remote mode, the remote switch 50 can be used to activate the magnetic coil 36 and engage the clutch 70. Preferably, in the remote mode of the system 11, either the remote switch 50 or the main switch 46 can be used to deactivate the magnetic coil 36. But, in the remote mode of the system 11, the main switch 46 cannot be used to activate the magnetic coil 36.

As indicated below in Table 1, the control device 10 processes the signals transmitted according to combinations of the positions of the switches 46, 48, 50. In particular, the positions of the switches 46, 48, 50 determine whether the control device 10 activates the magnetic coil 36 of the clutch 70 for the PTO 64. In Table 1, entries of "1" and "0" indicate voltage is and is not, respectively, applied to the particular input 14, 16, 18, 20 of the control device 10. Further, status entries of "valid" and "invalid" indicate the corresponding entries for the inputs 14, 16, 18, 20 are logical and illogical, respectively.

TABLE 1

| | Inputs | | | | | Switches | | |
| --- | --- | --- | --- | --- | --- | --- | --- | --- |
| Case | 14 | 16 | 18 | 20 | Status | 46 | 48 | 50 |
| 1 | 0 | 0 | 0 | 0 | invalid | | | |
| 2 | 0 | 0 | 0 | 1 | invalid | | | |
| 3 | 0 | 0 | 1 | 0 | valid | OFF | ON | ON |
| 4 | 0 | 0 | 1 | 1 | valid | OFF | ON | OFF |
| 5 | 0 | 1 | 0 | 0 | valid | OFF | OFF | ON |

TABLE 1-continued

| | Inputs | | | | | Switches | | |
|---|---|---|---|---|---|---|---|---|
| Case | 14 | 16 | 18 | 20 | Status | 46 | 48 | 50 |
| 6 | 0 | 1 | 0 | 1 | valid | OFF | OFF | OFF |
| 7 | 0 | 1 | 1 | 0 | invalid | | | |
| 8 | 0 | 1 | 1 | 1 | invalid | | | |
| 9 | 1 | 0 | 0 | 0 | invalid | | | |
| 10 | 1 | 0 | 0 | 1 | valid | ON | ON/OFF | OFF |
| 11 | 1 | 0 | 1 | 0 | valid | ON | ON | ON |
| 12 | 1 | 0 | 1 | 1 | invalid | | | |
| 13 | 1 | 1 | 0 | 0 | valid | ON | OFF | ON |
| 14 | 1 | 1 | 0 | 1 | invalid | | | |
| 15 | 1 | 1 | 1 | 0 | invalid | | | |
| 16 | 1 | 1 | 1 | 1 | invalid | | | |

As indicated in Table 1, the control device 10 recognizes sixteen cases where the voltage source line 52 is or is not coupled to each one of the inputs 14, 16, 18, 20. In each of the cases, the control device 10 tests whether the entries for the inputs 14, 16, 18, 20 is logically possible or else a malfunction of the components or the wiring exists, in which case the PTO 64 is disengaged and warning signals are produced automatically.

Figure 3:
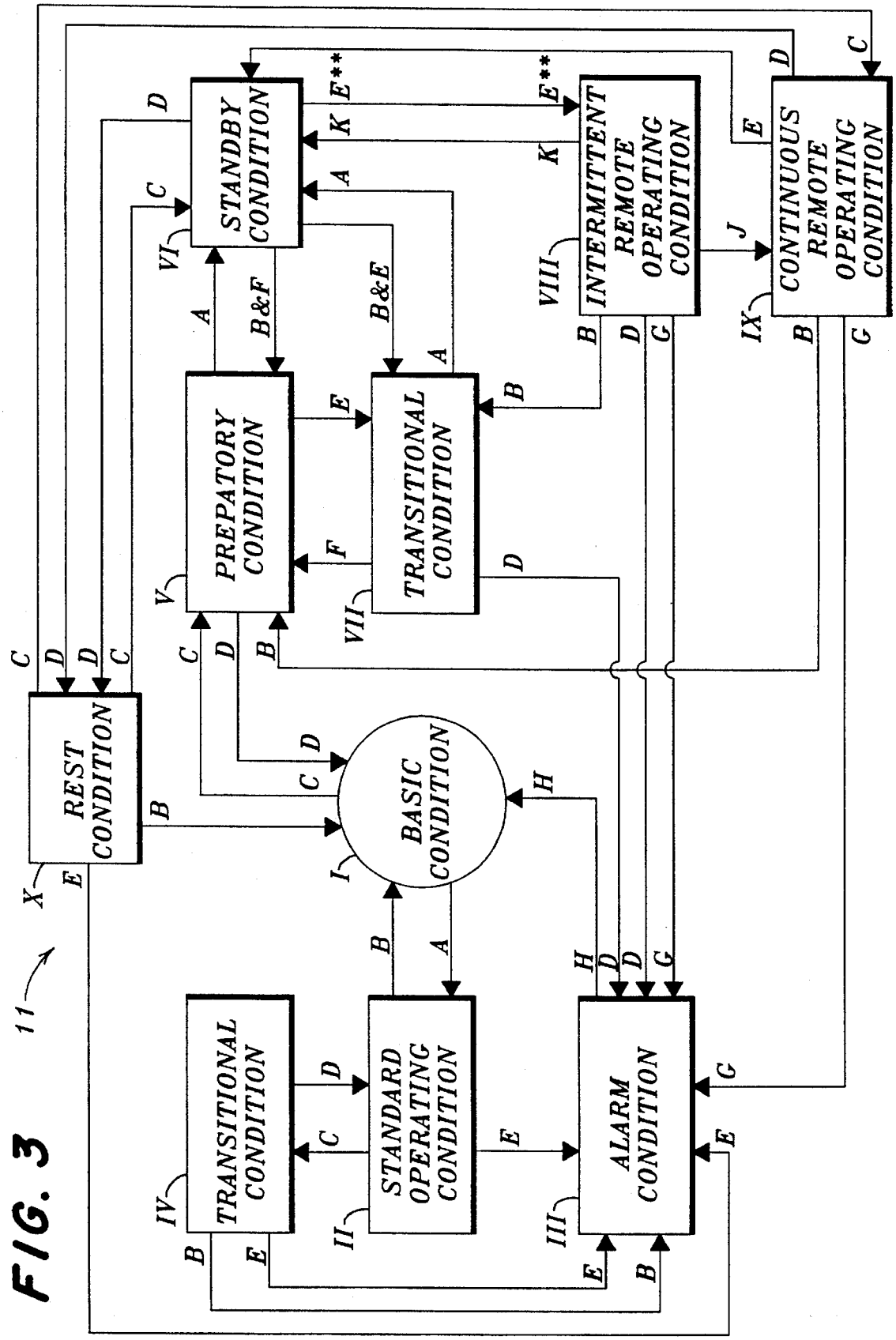
FIG. 3 is a condition diagram for the system of FIG. 2.

For the valid entries for the inputs 14, 16, 18, 20, the operation of the control device 10 is based on a circuit logic that is revealed by the condition diagram of FIG. 3. This condition diagram is relatively simple and can be augmented by additional functions.

The condition diagram of FIG. 3 indicates ten conditions, namely, basic condition I, standard operating condition II, alarm condition III, transitional condition IV, preparatory condition V, standby condition VI, transitional condition VII, intermittent remote operating condition VIII, continuous remote operating condition IX, and rest condition X. In particular, the conditions can be transmuted into each other by manipulations of the switches 46, 48, 50 and by signals of the rotational speed sensor 32, in each case in one direction of arrows A, B, C, D, E, E**, F, G, H, J, K, as shown below in Table 2, and combination arrows B&E, B&F, which represent corresponding combinations of the arrows.

The arrows A through J are associated with the following switch combinations:

TABLE 2

| Arrow | Situation | | |
|---|---|---|---|
| A | main switch 46 | moved to | ON position |
| B | main switch 46 | moved to | OFF position |
| C | selector switch 48 | moved to | ON position |
| D | selector switch 48 | moved to | OFF position |
| E | remote switch 50 | pressed to | ON position |
| E** | remote switch 50 | moved to | ON position |
| F | remote switch 50 | released to | OFF position |
| G | rotational speed sensor 32 indicates speed of power take-off 64 in remote mode of system 11 remains below one hundred rpm for more than five seconds | | |
| H | switches 46, 48, 50 | moved to | OFF positions |
| J | remote switch 50 | moved to | ON position for at least four seconds and then released to OFF position |
| K | remote switch 50 | pressed to | ON position for less than four seconds and then moved to OFF position |

All switch operations not explicitly shown in FIG. 3 lead to alarm condition III.

In the following explanation of the conditions, the voltage source line 52 is assumed to be live. In the basic condition I all the switches 46, 48, 50 are in their OFF positions and the PTO 64 is not engaged.

If the main switch 46 is moved to its ON position (arrow A), the system 11 changes from the basic condition I to standard operating condition II, in which the PTO 64 is engaged (coil 34 is energized) and the PTO indicator light 42 is illuminated. If the main switch 46 is moved to its OFF position (arrow B), the system 11 returns to the basic condition I.

If, starting from the condition II, the remote switch 50 is pressed to its ON position (arrow E), the system 11 changes to the alarm condition III, in which the PTO 64 is disengaged automatically and the remote mode indicator light 40 and PTO indicator light 42 are illuminated. Alarm condition III can be exited only returning all three of the switches 46, 48, 50 to their OFF positions (arrow H), in which case the system 11 changes to the basic condition I.

While in condition II, by switching the selector switch 48 from its OFF to its ON positions and from its ON to its OFF positions (arrows C and D, respectively), the system 11 is transmuted from condition II to transitional condition IV, in which the PTO 64 remains engaged, and then back to condition III. If, starting from condition IV, either the main switch 46 is moved to its OFF position (arrow B) or the remote switch 50 is pressed to its ON position (arrow E), the system 11 changes to the alarm condition III.

If, starting from the basic condition I, the selector switch 48 is turned to its ON position (arrow C), the system 11 changes to the preparatory condition V, in which the PTO 64 remains disengaged and the remote mode indicator light 40 is illuminated. If one turns the selector switch 48 to its OFF position (arrow D), the system 11 returns to the basic condition I.

From the preparatory condition V, if the main switch 46 is moved to its ON position (arrow A), the system 11 changes to the standby condition VI, in which the remote mode is activated, but the PTO 64 remains disengaged. In the standby condition VI, the warning flashers 34 are flashing, the remote mode and PTO indicator lights 40, 42 are illuminated, and the acoustic signaler 38 beeps at a frequency such as three hertz (Hz). If the main switch 46 is turned to its OFF position and the remote switch 50 is in its OFF position (arrow B&F), the system 11 returns to the preparatory condition V.

From preparatory condition V, pressing or closing remote switch 50 changes the system 11 to transitional condition VII in which the PTO 64 remains disengaged and the remote mode indicator light 40 flashes. While in transitional condition VII, if the switch 50 is released so that it returns to its OFF position the system returns to preparatory condition V. Also, while in transitional condition VII, if switch 46 is moved to its on position the system is changed to standby condition VI.

If standby condition VI is entered via transitional condition VII and the main switch 46 is turned to its OFF position while the remote switch 50 is still pressed to its ON position (arrow B&E), the system 11 returns to transitional condition VII. A return to the standby condition VI can be accomplished by turning the main switch 46 to its ON position (arrow A). While in transitional condition VII, moving selector switch 48 to its OFF position (arrow D) changes the system 11 to the alarm condition III.

If the standby condition VI exists, moving the remote switch 50 from its OFF position to its ON position (arrow E**) changes the system 11 to intermittent remote operating condition VIII, in which the PTO 64 is engaged and remains engaged only so long as the remote switch is pressed to its ON position. In the condition VIII, the remote mode and PTO indicator lights 40, 42 are illuminated and the acoustic signaler 38 beeps at a frequency of, for example, one Hz, in contrast to the frequency of three Hz in the standby condition VI.

If, during the condition VIII, the remote switch 50 is not held in its ON position for at least a predetermined brief period such as four seconds, the system 11 returns to the standby condition VI upon release of the switch 50 (arrow K). If the switch 50 is held in its ON position for the predetermined time (arrow J) the system 11 changes to continuous remote operating condition IX in which the PTO 64 continues to operate and the remote mode and PTO indicator lights 40, 42 remain illuminated even upon release of switch 50. If the selector switch 50 is again pressed to its ON position (arrow E), the PTO 64 is disengaged and the system 11 transmutes from condition IX to standby condition VI.

In condition VIII, the warning flashers 34 preferably are illuminated for the predetermined brief time (four seconds) and then turned off automatically to indicate the system 11 has transmuted to operating condition IX and the operator can release the remote switch 50 without disengaging the PTO 64. Further, the acoustic signaler 38 sounds only four beeps at the one Hz frequency, that is, the acoustic signaler 38 sounds only during the four seconds.

In the remote mode, the PTO 64 becomes disengaged when the system 11 transmutes from the conditions VIII or IX. If in the condition VIII the main switch 46 is turned to its OFF position (arrow B), the system 11 changes to the transitional condition VII. If in the condition VIII the selector switch 48 is turned to its OFF position (arrow D), the system 11 changes to the alarm condition III. If in the operating condition IX the main switch 46 is switched to its OFF position (arrow B), the system 11 changes to the preparatory condition V.

If the PTO 64 is engaged and its rotational speed remains below, for example, one hundred rpm for longer than, for example, five seconds (arrow G), the system 11 transmutes from either of the conditions VIII or IX to the alarm condition III in order to automatically disengage the PTO 64.

Starting from the standby condition VI or from the operating condition IX, if the selector switch 48 is turned to its OFF position (arrow D), the system 11 changes to the rest condition X, in which the PTO 64 is disengaged and the last condition VI or IX is retained in the memory (not shown) of the control device 10. The acoustic signaler 38 is sounded at the three Hz frequency and the remote mode indicator light 40 as well as the warning flashers 34 are activated. If in the rest condition X the selector switch 48 is again turned to its ON position (arrow C), the system 11 returns to its last condition VI or IX. If in the rest condition X the main switch 46 is turned to its OFF position (arrow B), the system 11 changes to the basic condition I. If in the rest condition X the remote switch 50 is pressed to its ON position (arrow E), the system 11 changes to the alarm condition III.

From this disclosure showing and describing a specific embodiment of the invention, various obvious modifications of the invention will become apparent to those skilled in the art and can be made without departing from the spirit or scope of the invention. For example, the control device could be made sensitive to the speed of the PTO when the system is in the standard mode the same as it is when in the remote mode. Because of the possible variations in the invention described above, the invention should not be limited to the detailed description or the specific illustrations, but only to the fair scope of the following claims.

What is claimed is:

1. A system for engaging and disengaging a PTO on a work vehicle, the work vehicle having an operator'station, a main switch positioned at the operator'station and switchable between OFF and ON positions, a momentary push-button switch positioned remotely of the operator'station and switchable between OFF and ON positions, and a voltage source coupled to the main and remote switches, the system comprising:

a selector switch positioned at the operator'station and coupled to the main and remote switches, the selector switch being switchable between OFF and ON positions to select, respectively, standard and remote modes of PTO operation that allow, respectively, the main and remote switches to engage and disengage the PTO; and a control device coupled to the PTO and the switches to interpret combinations of the positions of the switches for engagement and disengagement of the PTO, and preventing activation of the remote mode of PTO operation when the PTO is engaged.

2. The system of claim 1, wherein:

the control device conditions activation of the remote mode of PTO operation on the selector switch being switched to its ON position followed by the main switch being switched to its ON position.

3. The system of claim 1 wherein, when the PTO is engage in either the standard or remote mode, the control device is responsive to a change in position of either the main or remote switch to disengage the PTO.

4. The system of claim 1, further comprising:

warning signalers coupled to the control device, wherein:

the control device activates and deactivates the warning signalers based on the combinations of the positions of the switches.

5. The system of claim 4, wherein:

the operator'station is a cab, and the warning signalers include warning flashers visible outside the cab and an acoustic signaler, a remote mode indicator light, and a PTO indicator light positioned inside the cab.

6. A system for engaging and disengaging a PTO on a work vehicle, the work vehicle having an operator'station, a main switch positioned at the operator'station and switchable between OFF and ON positions, a momentary push-button switch positioned remotely of the operator'station and switchable between OFF and ON positions, and a voltage source coupled to the main and remote switches, the system comprising:

a selector switch positioned at the operator'station and coupled to the main and remote switches, the selector switch being switchable between OFF and ON positions to select, respectively, standard and remote modes of PTO operation that allow, respectively, the main and remote switches to engage and disengage the PTO; and a control device coupled to the PTO and the switches to interpret combinations of the positions of the switches for engagement and disengagement of the PTO, said control device storing a preselected time value and timing the duration of continuous operation of the remote switch in its ON position while the system is in the remote mode to prevent continuation of engagement of the PTO in the remote mode after the continuous operation of the remote switch unless the remote switch has been in continuous operation for a time period at least equalling the preselected time value.

7. The system of claim 6, wherein:

when the PTO is engage in either the standard or remote mode, the control device is responsive to a change in position of either the main or remote switch to disengage the PTO.

8. The system of claim 6, further comprising:

a rotational speed sensor positioned adjacent to the PTO and coupled to the control device for continuously providing to the control device a rotational speed value of the PTO as the PTO is engaged in the remote mode, wherein:

the control device stores a preselected rotation speed value; and the control device conditions continuation of engagement of the PTO in the remote mode on the rotational speed value of the PTO at least equalling the preselected rotation speed value.

9. The system of claim 6, further comprising:

warning signalers coupled to the control device, wherein:

the control device activates and deactivates the warning signalers based on the combinations of the positions of the switches.

10. The system of claim 9, wherein:

the operator'station is a cab, and the warning signalers include warning flashers visible outside the cab and an acoustic signaler, a remote mode indicator light, and a PTO indicator light positioned inside the cab.

11. A system for engaging and disengaging a PTO on a work vehicle, the work vehicle having an operator'station, a main switch positioned at the operator'station and switchable between OFF and ON positions, a momentary push-button switch positioned remotely of the operator'station and switchable between OFF and ON positions, and a voltage source coupled to the main and remote switches, the system comprising:

a selector switch positioned at the operator'station and coupled to the main and remote switches, the selector switch being switchable between OFF and ON positions to select, respectively, standard and remote modes of PTO operation that allow, respectively, the main and remote switches to engage and disengage the PTO; and a control device coupled to the PTO and the switches to interpret combinations of the positions of the switches for engagement and disengagement of the PTO, said control device responsive, when the PTO is engage in either the standard or remote mode, to a change in position of either the main or remote switch to disengage the PTO.

12. The system of claim 11, wherein:

the control device stores a preselected time interval value; and the control device conditions the continuation of engagement of the PTO in the remote mode on the rotational speed value of the PTO at least equalling the preselected rotation speed value at least once per the preselected time interval value.

* * * * *